United States Patent [19]

Diez

[11] 4,121,633

[45] Oct. 24, 1978

[54] TRANSFER DEVICE FOR HEAT SENSITIVE MATERIAL

[76] Inventor: Jerry Diez, 120 Park Dr., Gonzales, La. 70737

[21] Appl. No.: 856,283

[22] Filed: Dec. 1, 1977

Related U.S. Application Data

[63] Continuation-in-part of Ser. No. 733,079, Oct. 18, 1976, abandoned.

[51] Int. Cl.[2] .............................................. B65B 3/04
[52] U.S. Cl. ...................................... 141/69; 141/98; 141/39.2
[58] Field of Search ....................................... 141/4–8, 141/9–12, 82, 37–66, 99, 100, 114, 392, 69–81, 98; 23/253 R, 259

[56] References Cited

U.S. PATENT DOCUMENTS

| 1,770,380 | 7/1930 | Young | 141/66 |
| 2,678,761 | 5/1954 | Warren et al. | 141/66 |
| 3,951,186 | 4/1976 | Mencacci | 141/5 |

*Primary Examiner*—Houston S. Bell
*Attorney, Agent, or Firm*—Roy, Kiesel, Patterson & Abadie

[57] ABSTRACT

A device for use in loading heat sensitive material into sealable containers having an inert gas flow control assembly for substantially reducing contact of the material with oxygen during loading.

7 Claims, 3 Drawing Figures

TRANSFER DEVICE FOR HEAT SENSITIVE MATERIAL

RELATED APPLICATIONS

This is a continuation-in-part of U.S. patent application Ser. No. 733,079, filed Oct. 18, 1976, now abandoned, by the inventor herein and entitled "Transfer Device For Heat Sensitive Material" and mention is made herein for purposes of obtaining benefit of its filing date.

BACKGROUND OF THE INVENTION

1. Field of the Invention

This invention relates broadly to cooling devices, and more particularly to devices for use in loading heat sensitive material into sealable containers to reduce contact with oxygen.

2. Prior Art

The removal of heat sensitive material, such as various catalyst used in the petrochemical industry, from large vats or tanks to smaller sealable drums for storage or shippage has always caused many problems. Presently, various techniques and methods are used to minimize the contact time of air with the heat sensitive material. However, for various reasons these techniques and methods are not as successful as desired, and thus result in ruined catalyst and in some instances small explosions.

SUMMARY OF THE INVENTION

Therefore, it is an object of this invention to provide a device for use in transferring heat sensitive catalyst from one container to another that reduces contact of the material with oxygen.

Another object of this invention is to provide a device that minimizes spillage during transfer of heat sensitive catalyst from one container to another.

A further object of this invention is to provide a device which can be left in the sealable container after the heat sensitive material has been transferred, and which can be utilized to reopen the container.

Other objects and advantages of this invention will become apparent from the ensuing descriptions of the invention.

Accordingly, a device is provided having a covering plate which can fit in the container opening, an inert gas distribution assembly having a hollow structure which receives the inert gas through an opening leading into a cavity within the plate means, wherein the plate means' cavity is connected by tubing to an opening in the covering plate leading into the container and wherein the covering plate has a passageway through which can pass tubing that carries the material being transferred.

In another aspect of this invention, a device for reducing contact of the heat sensitive material with air during transfer into a sealable container, as well as, for reopening the sealed container while again reducing contact with air which comprises a hollow tubing having a first section which is shaped to fit within the container and a second section connected to the first and which is constructed of flexible, collapsible material wherein the first section is provided with multiple openings through which inert gas being pumped through the tubing can escape into the container.

PREFERRED EMBODIMENTS OF THE INVENTION

Without any intent to restrict the scope of this invention, the preferred embodiments will be described with reference to the transfer of a petrochemical catalyst from large tanks to conventional 50 gallon metal drums while using nitrogen as an inert gas.

Figure 1:
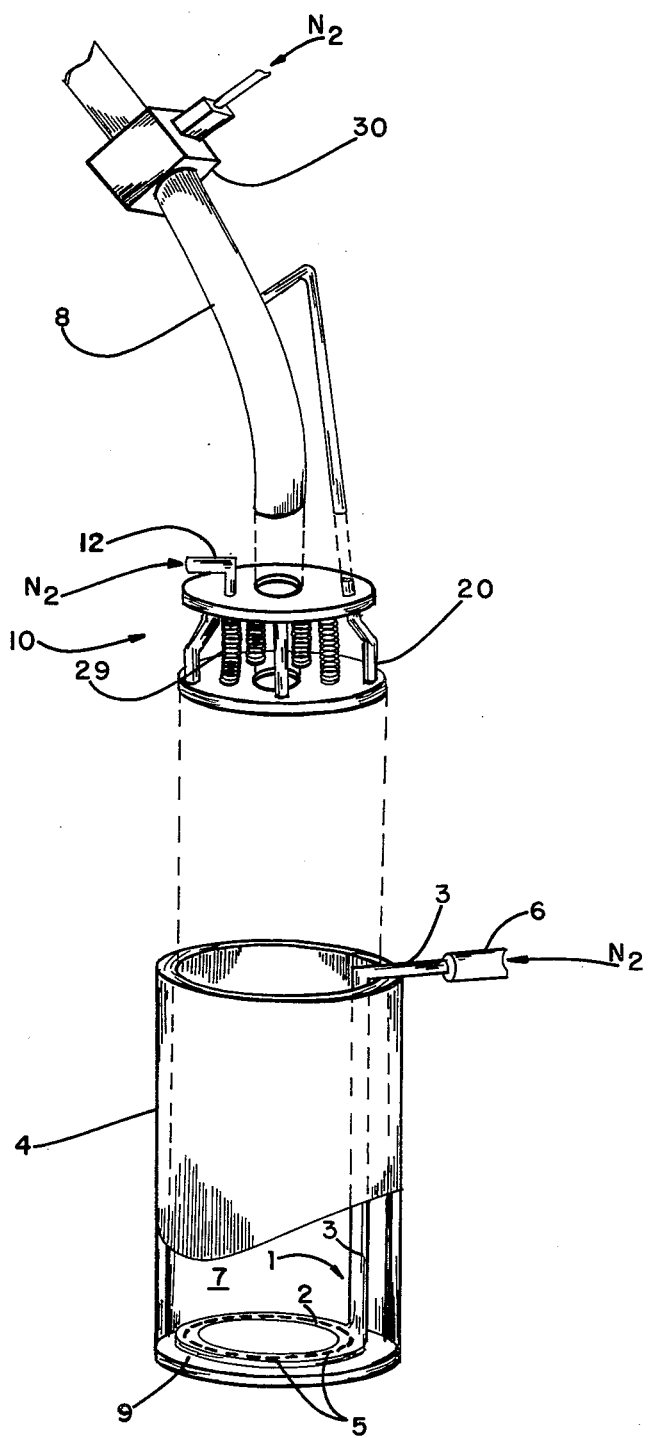
FIG. 1 is a cutaway, exploded perspective view of a preferred embodiment of this invention utilizing both the loading device and the device for reducing contact of the heat sensitive material with air.

In a first aspect of this invention as seen in FIG. 1, a device indicated generally by the numeral 1, comprising a first section 2 of tubing and a second section 3 of tubing connected to one another can be used in reducing contact of the catalyst with oxygen or air in drum 4. Tubing section 2 is provided with multiple openings 5 through which the nitrogen entering tubing section 3 through source 6 and passing into section 2 can flow out into cavity 7 of drum 4. In this manner, the nitrogen flowing out of openings 5 will replace some of the air in cavity 7. Therefore, as the catalyst enters cavity 7 from tubing 8, it will not contact as much air. The amount of air remaining in cavity 7 can be regulated to some extent by the number and position of openings 5, as well as, the pressure at which the nitrogen exits openings 5.

In a preferred embodiment, section 2 will be positioned near the bottom 9 of drum 4 to insure removal of air from the bottom of cavity 7. A nitrogen pressure of up to 3 psi at the entrance of section 3 is preferred.

In another preferred embodiment, section 3 will be constructed from a flexible, collapsible material, such as 3 mil polyethylene. This allows for the conventional sealing of drum 4 without the need to remove device 1 from drum 4. This has a further advantage that drum 4 can be easily opened later simply by applying nitrogen pressure through section 3 which in this embodiment extends outside the sealed drum.

Figure 2:
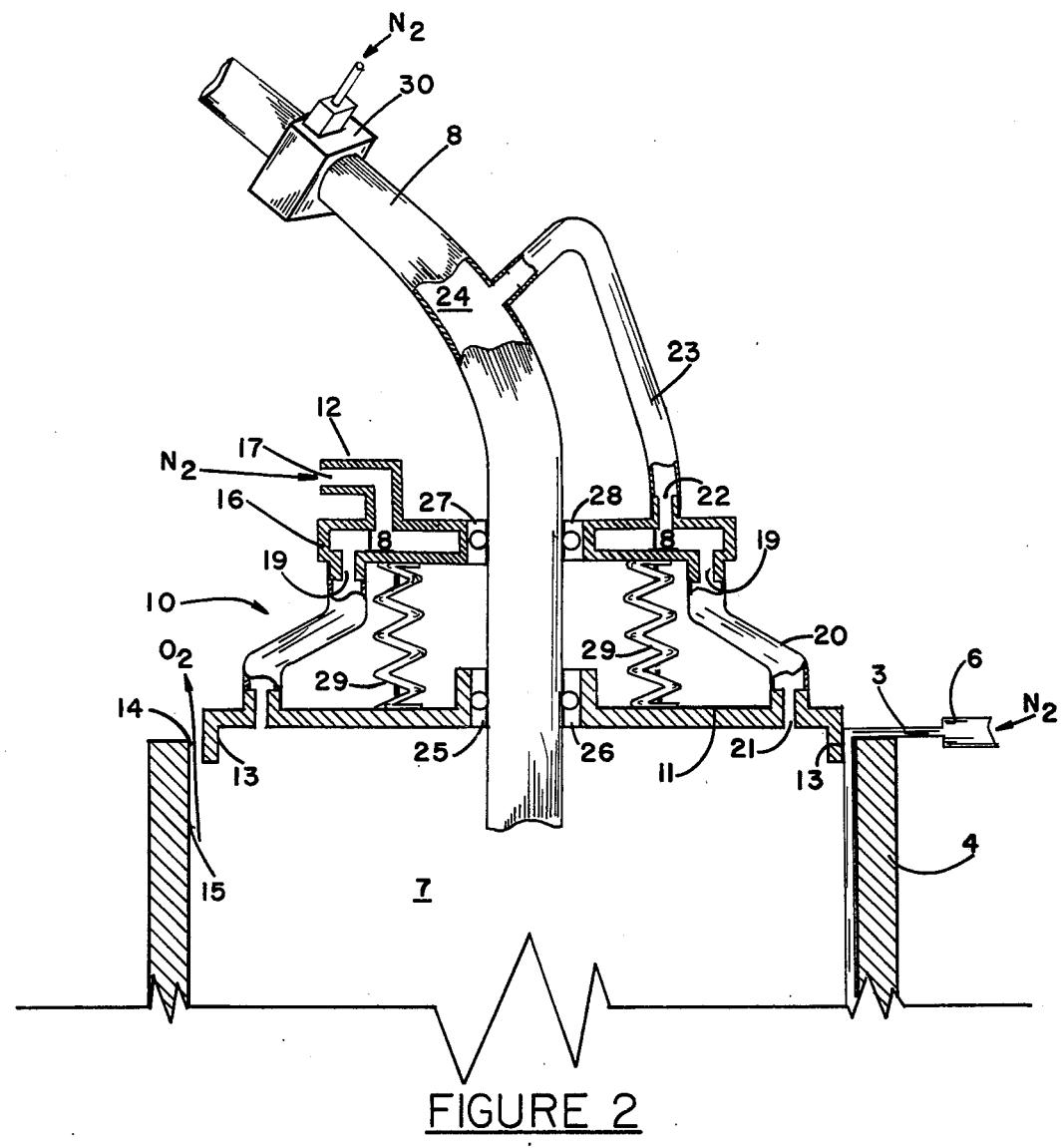
FIG. 2 is a cross-sectional view of the device shown in FIG. 1.

The device described above while adequate for many heat sensitive materials is more effective when used in conjunction with a second device, indicated generally by the numeral 10. Device 10 comprises a covering plate 11 which is shaped to fit in the opening of drum 4 as seen in FIG. 2 and a nitrogen distribution assembly, indicated generally by the numeral 12. In a preferred feature, plate 11 has lip member 13 that forms a small passageway 14 with drum interior wall surface 15 through which air in cavity 7 can escape. In another preferred feature, nitrogen distribution assembly 12 comprises a hollow structure 16 having opening 17 through which nitrogen enters into cavity 18 (preferably at a pressure between 5-10 psi) and flows through structure openings 19, flexible hosing 20 and covering plate openings 21 into drum cavity 7. This embodiment provides additional nitrogen to replace the air in drum cavity 7.

In another preferred embodiment, hollow structure 12 has an opening 22 connected to tubing 8 by hose 23 to provide nitrogen into tubing cavity 24 for contacting with the catalyst before it enters drum cavity 7. In a more preferred embodiment, tubing 8 extends through passageway 25 in covering plate 11 (more preferably through conventional collar bearing means 26) to direct the flow of catalyst into the nitrogen created atmosphere and to prevent spillage of the catalyst. Additional control of tubing 8 can be obtained if tubing 8 also extends through passageway 27 of hollow structure 12 (again more preferably through conventional collar bearing means 28). In this embodiment, it is preferred that hollow structure 12 and covering plate 11 be flexibly connected by springs 29.

It is also preferable that a conventional pneumatic gate valve 30 (generally operated at 90 psi) be provided in tubing 8, more preferably above tubing 23 for control of catalyst flow.

Figure 3:
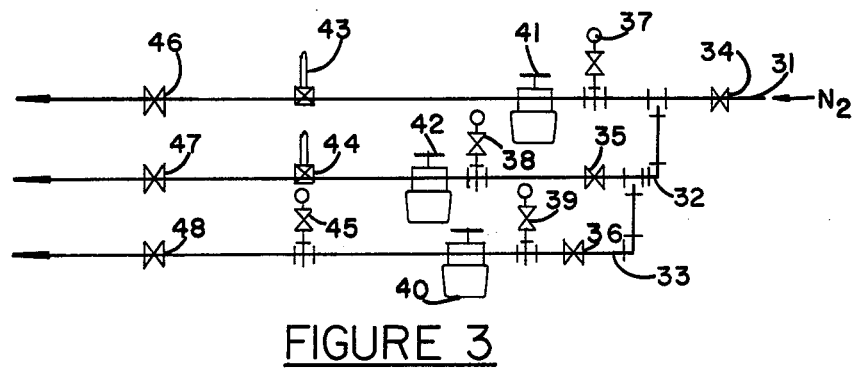
FIG. 3 is a schematic showing one embodiment of an inert gas supply system that can be used with the FIG. 1 devices.

To facilitate the use of device 1 and 11, it is preferable to utilize a common source of nitrogen which can be regulated as shown in FIG. 3. The nitrogen in excess of 90 psi in line 31 first passes through valve 34 where part of it is diverted into line 32 by a conventional T-member and part of that portion subsequently diverted into line 33 by another T-member. Nitrogen flowing past valve 34 in line 31 passes through pressure meter 37 and into pressure regulator 41 which reduces the pressure to about three psi. Flow meter 43 is placed in line 31 to indicate that the pressure is maintained at the desired level going into tubing section 3. Finally, a safety valve 46 is placed at a position located before the nigrogen enters tubing section 3 in order to cut off the nitrogen when desired. The nitrogen in line 32 also travels through valve 35, pressure meter 37, pressure regulator 42, flow meter 44 and safety valve 47 before entering opening 17 at a pressure of 5–10 psi as set by pressure regulator 42. Similarly, nitrogen flowing through line 33 passes through valve 36, pressure indicator 39, pressure regulator 40, a second pressure indicator 45 and safety valve 48 before going to gate valve 30. Because pressure in line 33 will be about 90 psi, second pressure indicator 45 is satisfactory instead of using a flow meter as in lines 31 and 32.

From the foregoing, it is clear that the catalyst traveling through tubing 8 is first surrounded by the nitrogen and is emptied into a nitrogen concentrated atmosphere in cavity 7 of drum 4. Through proper control of nitrogen flow, the catalyst will come in contact with a minimum amount of oxygen.

There are, of course, many obvious alternate embodiments not specifically disclosed, but whose exclusion is not meant to limit the scope of this invention except as found in the following claims.

What I claim is:

1. A device for use in reducing contact of heat sensitive material with oxygen during transfer of said material from a first container to a second container having an opening to receive said material, which comprises:
    (a) a covering plate shaped to fit into said second container opening, said covering plate having an inert gas receiving passageway opening into said second container and having a material receiving passageway opening into said second container;
    (b) an inert gas distribution assembly comprising an enclosed structure having a cavity, a first opening for receiving said inert gas into said cavity, hollow connecting means attached at one end to a second opening leading to said cavity and attached at its other end to said inert gas receiving passageway to form a passageway for said inert gas to pass from said cavity to said inert gas receiving passageway; and
    (c) a hollow tubing having means to receive said material from said first container and having one end attached to said material receiving passageway to form a passageway for said material to pass from said first container to said second container.

2. A device according to claim 1 wherein said hollow tubing comprises a pneumatic gate valve for controlling the flow of said material through said hollow tubing.

3. A device according to claim 1 wherein said hollow tubing comprises a tubing inert gas opening for receiving said inert gas.

4. A device according to claim 3 comprising an inert gas metering assembly having
    (a) a source of inert gas capable of providing said inert gas at a pressure of at least 90 psi;
    (b) a first delivery line assembly connected to said source at one end and to said gate valve means at its opposite end, said first delivery line assembly having a first pressure regulator capable of regulating said inert gas pressure to 90 psi or less and a first safety valve between said ends;
    (c) a second delivery line assembly connected to said source at one end to said hollow structure opening at its opposite end, said second delivery line assembly having a second pressure regulator capable of regulating said inert gas pressure between 5 and 10 psi and a second safety valve between said second delivery line assembly's ends; and
    (d) a third delivery line assembly connected to said source at one end to said second section at its opposite end, said third delivery line assembly having a third pressure regulator capable of regulating said inert gas pressure to 3 psi or less and a third safety valve between said third delivery line assembly's ends.

5. A device according to claim 1 wherein a collar bearing means is connected within said material receiving passageway and through which said hollow tubing passes.

6. A device according to claim 1 wherein said enclosed structure and said covering plate are separated by springs whose opposite ends are attached to said enclosed structure and said covering plate, respectively.

7. A device for use in reducing contact of heat sensitive material with oxygen during transfer of said material from a first container to a second container having an opening to receive said container, which comprises: a hollow tubing having first and second hollow sections connected to one another to form a passageway wherein said first section is shaped to fit within said second container and having openings leading from said passageway and into said second container and wherein said second section is attached at one end to a source of inert gas to allow said inert gas to flow to said first section and through said openings, said second section being constructed from flexible, collapsible material and being of sufficient length to extend outside said second container.

* * * * *